US012722400B2

(12) United States Patent
Zhang et al.

(10) Patent No.: US 12,722,400 B2
(45) Date of Patent: Sep. 1, 2026

(54) PORTABLE THERMAL PRINTING DEVICE

(71) Applicant: Jianjun Huang, Guangzhou (CN)

(72) Inventors: Wenlong Zhang, Guangzhou (CN); Jianjun Huang, Guangzhou (CN)

(73) Assignee: Jianjun Huang, Guangzhou (CN)

( * ) Notice: Subject to any disclaimer, the term of this patent is extended or adjusted under 35 U.S.C. 154(b) by 0 days.

(21) Appl. No.: 19/354,589

(22) Filed: Oct. 9, 2025

(65) Prior Publication Data

US 2026/0034801 A1 Feb. 5, 2026

(51) Int. Cl.

| | |
|---|---|
| ***B41J 2/335*** | (2006.01) |
| ***B41J 2/33*** | (2006.01) |
| ***B41J 2/355*** | (2006.01) |
| ***B41J 3/36*** | (2006.01) |

(52) U.S. Cl.

CPC ............. *B41J 2/33515* (2013.01); *B41J 2/33* (2013.01); *B41J 2/3352* (2013.01); *B41J 2/3353* (2013.01); *B41J 2/3355* (2013.01); *B41J 2/3358* (2013.01); *B41J 2/3558* (2013.01); *B41J 3/36* (2013.01)

(58) Field of Classification Search

CPC ....... B41J 2/32; B41J 2/33; B41J 2/335; B41J 2/33505; B41J 2/33515; B41J 2/3352

USPC .......................................................... 219/216

See application file for complete search history.

(56) References Cited

U.S. PATENT DOCUMENTS

| | | | | |
|---|---|---|---|---|
| 5,221,829 | A * | 6/1993 | Yahav | H05B 3/68 219/448.11 |
| 5,528,345 | A * | 6/1996 | Hasegawa | G03G 15/2064 399/122 |
| 2008/0219744 | A1 | 9/2008 | Valverde et al. | |
| 2009/0020521 | A1 * | 1/2009 | Blaszczykiewicz | H05B 3/342 219/529 |
| 2014/0021193 | A1 * | 1/2014 | Chao | H05B 3/145 219/536 |
| 2018/0141328 | A1 * | 5/2018 | Chen | B41F 16/0046 |
| 2019/0100027 | A1 * | 4/2019 | Matsusaki | B41J 2/3357 |
| 2021/0309021 | A1 | 10/2021 | Tsao et al. | |
| 2021/0309026 | A1 | 10/2021 | Peng | |
| 2023/0239972 | A1 * | 7/2023 | Desmeules | A41D 13/0051 219/211 |

* cited by examiner

*Primary Examiner* — Sang Y Paik

(57) ABSTRACT

Provided is a portable thermal printing device including: a support plate assembly; a heat insulation plate disposed on the support plate assembly; and a heating plate disposed on the heat insulation plate and including a uniform heating plate body, a covering layer, and a heating element disposed between the uniform heating plate body and the covering layer; and an electrical connection element detachably connected to the heating element via magnetic attraction and configured to connect to an external power source and supply power to the heating element. With such a simple structure, portable thermal printing operations can be achieved.

16 Claims, 8 Drawing Sheets

PORTABLE THERMAL PRINTING DEVICE

TECHNICAL FIELD

The present disclosure relates to the technical field of thermal printing equipment, and in particular, to a portable thermal printing device.

BACKGROUND

With the advancement of science and technology, the thermal printing technology is being applied increasingly widely. However, common thermal printing apparatuses are generally bulky and primarily used in large-scale industrial automation scenarios, making them difficult to meet users' needs for miniaturized thermal printing. At present, some miniaturized thermal printing apparatuses have emerged, such as the patent published with the publication number No. US2018/0141328 A1, which discloses a decoration device including a charging base and a stamping plate body detachably mounted on the charging base. The stamping plate body includes a heating plate and a cover plate. A space between the heating plate and the cover plate is adapted to receive a stamping template and a foil. However, the structure of the heating plate is overly simplistic. During the heating process, in addition to heating the stamping template, a significant portion of the heat is transferred away from the stamping template, resulting in heat loss and reduced heating efficiency. There remains a need for an improved solution.

SUMMARY

In order to solve the above technical problems, the present disclosure employs the following technical solutions.

A portable thermal printing device includes:

a support plate assembly;

a heat insulation plate disposed on the support plate assembly; and a heating plate disposed on the heat insulation plate and including a uniform heating plate body, a covering layer, and a heating element disposed between the uniform heating plate body and the covering layer, where the heating plate is configured to heat a thermal printing assembly.

Preferably, the uniform heating plate body is connected side by side to the heat insulation plate, and the covering layer is in contact with the thermal printing assembly.

Preferably, the uniform heating plate body is one of an aluminum plate, a copper plate, and a stainless steel plate.

Preferably, the heating element is one of a resistance wire, a reticular heating body, and a resistance element formed by sintering from a resistance paste, where the resistance wire, the reticular heating body, and the resistance element are able to be distributed on the uniform heating plate body.

Preferably, the covering layer is one of a silicone coating, a thermoplastic elastomer coating, a polyurethane coating, a biological resin coating, and a polypropylene coating.

Preferably, the covering layer is provided with location referencing lines.

Preferably, the portable thermal printing device further includes an electrical connection element detachably connected to the heating element via magnetic attraction and configured to connect to an external power source and supply power to the heating element.

Preferably, the portable thermal printing device further includes a circuit board disposed on the support plate assembly, where the heating element is electrically connected to the circuit board; a magnetic attracting connector is disposed on the circuit board; the electrical connection element is fit with the magnetic attracting connector via magnetic attraction; and the electrical connection element is configured to supply power to the heating element via the circuit board.

Preferably, the circuit board includes a direct current to direct current (DC-DC) conversion module configured to receive an external DC voltage and convert the DC voltage to a predetermined DC voltage.

Preferably, the support plate assembly includes a support plate disposed under the heat insulation plate and a bottom plate disposed under the support plate; the bottom plate includes a supporting bottom plate corresponding to the support plate and a support frame surrounding the supporting bottom plate; the circuit board is disposed within the support frame; and the magnetic attracting connector is exposed from the support frame.

Preferably, the support frame extends at one end of the supporting bottom plate to form a handle frame; and a gripping opening is formed in the handle frame.

Preferably, the bottom plate is provided with a heat dissipation structure.

Preferably, the portable thermal printing device further includes a buzzer electrically connected to the circuit board and configured to produce a buzzing prompt sound; and/or a key module disposed on the support plate assembly and electrically connected to the circuit board.

Preferably, the portable thermal printing device further includes a thermal printing assembly, where the thermal printing assembly includes a thermal printing template, a thermal printing paper, and a hard paper board that are stacked in sequence, and the thermal printing template is disposed on the heating plate; and the thermal printing paper is disposed on the thermal printing template.

Preferably, a pressure is applied to the portable thermal printing device by one of manual pressing equipment, isostatic pressing equipment, or a rolling device such that a pattern of the thermal printing template is transfer-printed onto the thermal printing paper.

Preferably, the portable thermal printing device further includes a bearing base disposed under the support plate assembly.

Preferably, the bearing base includes a pressure bearing plate and a limiting edge extending from a periphery of the pressure bearing plate towards the support plate assembly; and the support plate assembly corresponds to a space between the pressure bearing plate and the limiting edge.

Preferably, the heat insulation plate includes one of an aerogel plate, a vacuum thermal isolation plate, a polyurethane rigid foam plate, an expanded polystyrene plate, and an extruded polystyrene plate.

Preferably, the support plate assembly is made of a material of one of phenolic plastics, epoxy resin, urea resin, melamine formaldehyde resin, polypropylene, polyvinyl chloride, and polystyrene.

The present disclosure has the following beneficial effects. The support plate assembly, the heat insulation plate, and the heating plate are miniaturized, and the heating plate includes the uniform heating plate body, the covering layer, and the heating element disposed therebetween. During the heating process, on the one hand, the overall heating of the heating plate can be accelerated with the uniform heating plate body, achieving effective heating; and on the other hand, ineffective heating caused by heat loss can be reduced. The portable thermal printing device has the advantages of simple structure, convenience in carrying and use, good heating effect, and high efficiency, and provides good use experience for users.

DETAILED DESCRIPTION OF THE EMBODIMENTS

Figure 1:
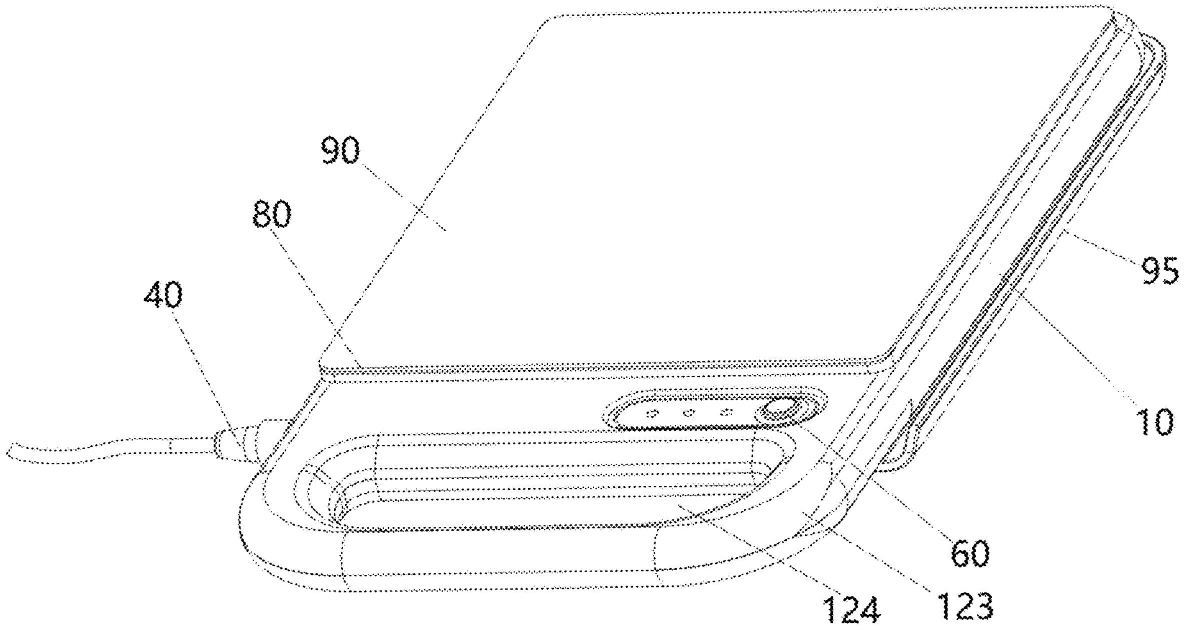
FIG. 1 is a three-dimensional schematic structural diagram of a portable thermal printing device of the present disclosure.

The technical solutions in the embodiments of this application are clearly and completely described below with reference to the drawings in the embodiments of this application. Apparently, the described embodiments are only some rather than all of the embodiments of this application. It should be understood that the present application is not limited by the examples and embodiments publicly described herein. All other embodiments obtained by a person of ordinary skill in the art based on the embodiments of the present application without creative efforts shall fall within the protection scope of the present application.

In the description of the present disclosure, it should be understood that orientations or position relationships indicated by terms "length", "width", "upper", "lower", "front", "rear", "left", "right", "vertical", "horizontal", "top", "bottom", "inside", "outside", and the like are orientations or position relationships as shown in the drawings, for ease of describing the present disclosure and simplifying the description, rather than indicating or implying that the mentioned devices or elements must have a specific orientation and must be established and operated in a specific orientation, and thus, these terms cannot be understood as a limitation to the present disclosure.

In addition, the terms "first" and "second" are merely intended for a purpose of description, and shall not be understood as an indication or implication of relative importance or implicit indication of a quantity of indicated technical features. Thus, features defined with "first" and "second" may explicitly or implicitly include one or more of the features. In the description of the present disclosure, the term "a plurality of" means two or more, unless otherwise specifically defined.

In the present disclosure, unless otherwise clearly specified, the terms "installation", "interconnection", "connection" and "fixation" are intended to be understood in a broad sense. For example, the connection may be a fixed connection, removable connection or integral connection; may be a mechanical connection or electrical connection; may be a direct connection or indirect connection using a medium; and may be a communication or interaction between two elements. Those of ordinary skill in the art may understand the specific meanings of the above terms in the present disclosure based on specific situations.

Figure 2:
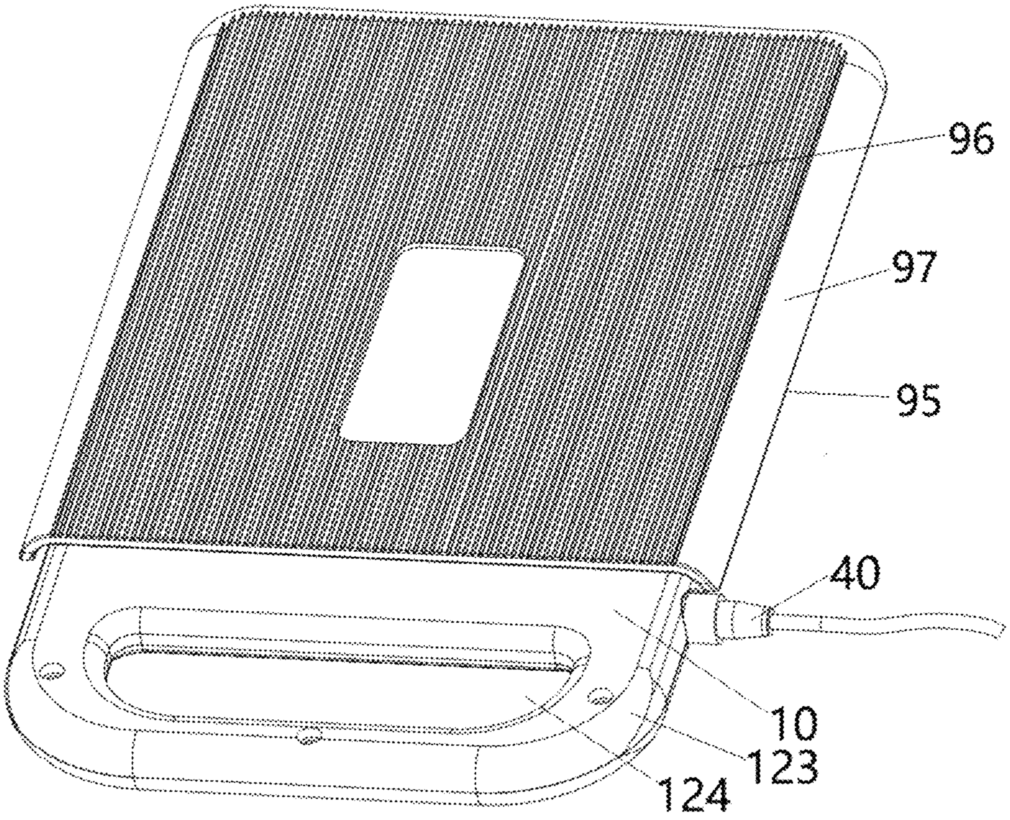
FIG. 2 is a three-dimensional schematic structural diagram of the portable thermal printing device of FIG. 1 from another perspective.
Figure 3:
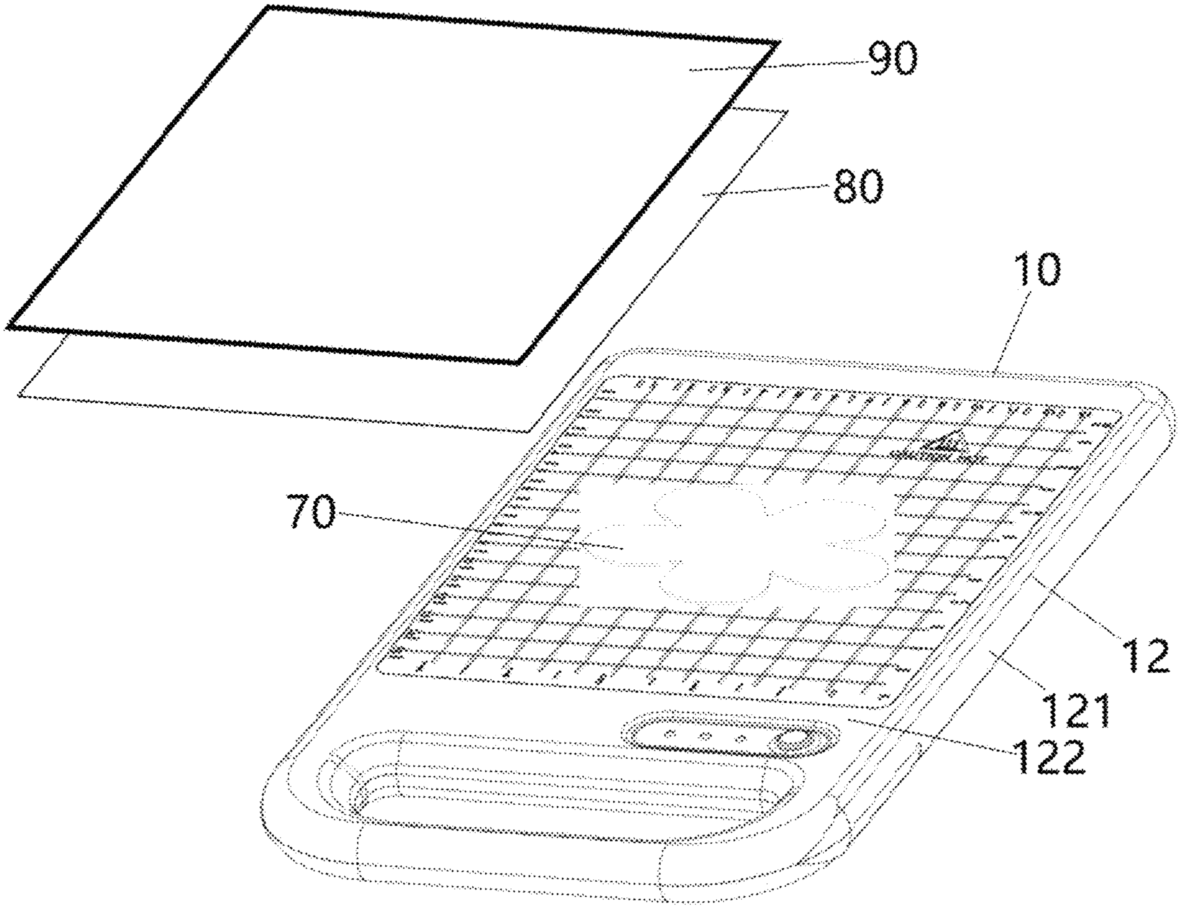
FIG. 3 is an exploded schematic structural diagram of some elements of the portable thermal printing device of FIG. 1 with an electrical connection element removed.
Figure 4:
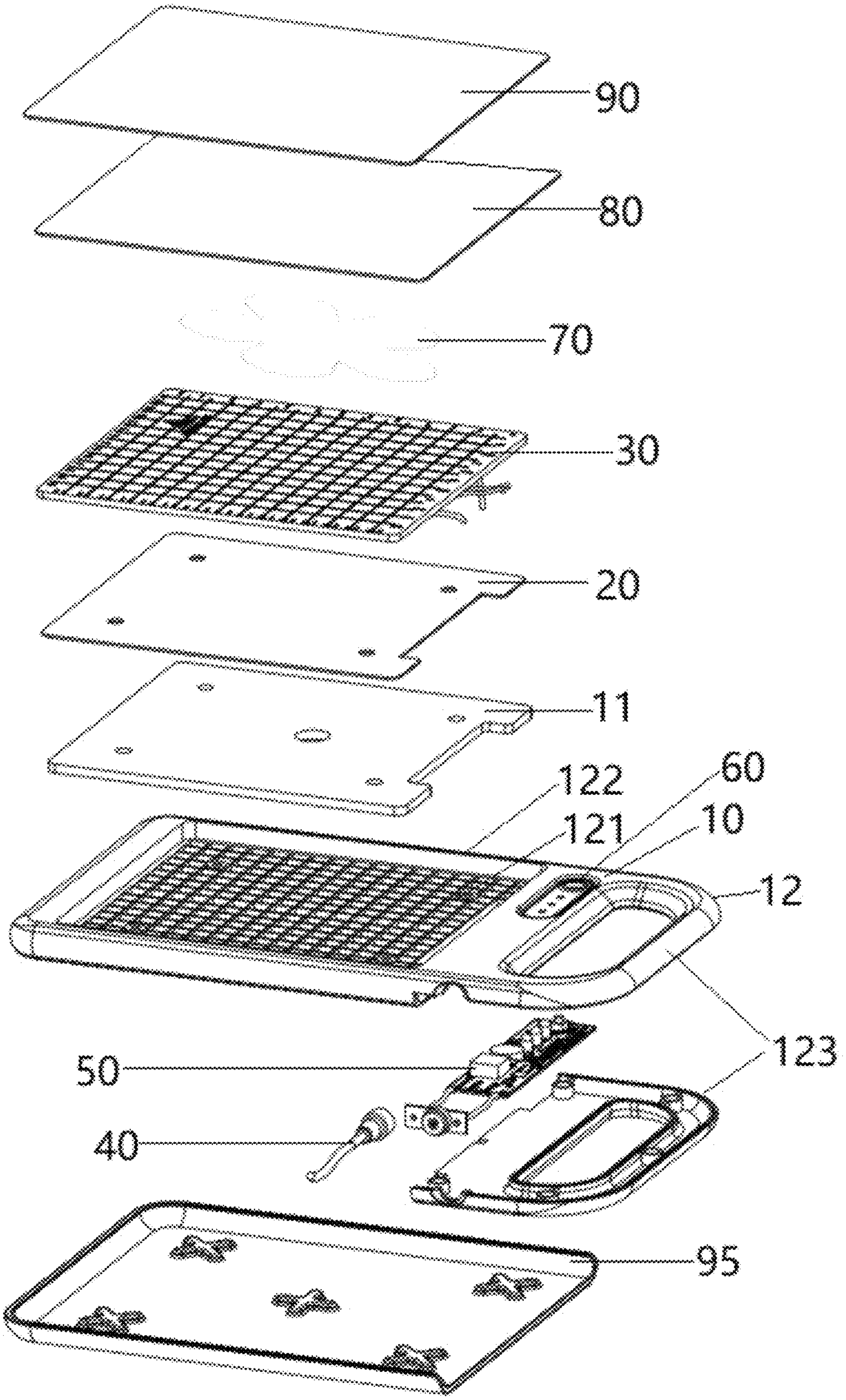
FIG. 4 is an exploded schematic structural diagram of the portable thermal printing device of FIG. 1.
Figure 5:
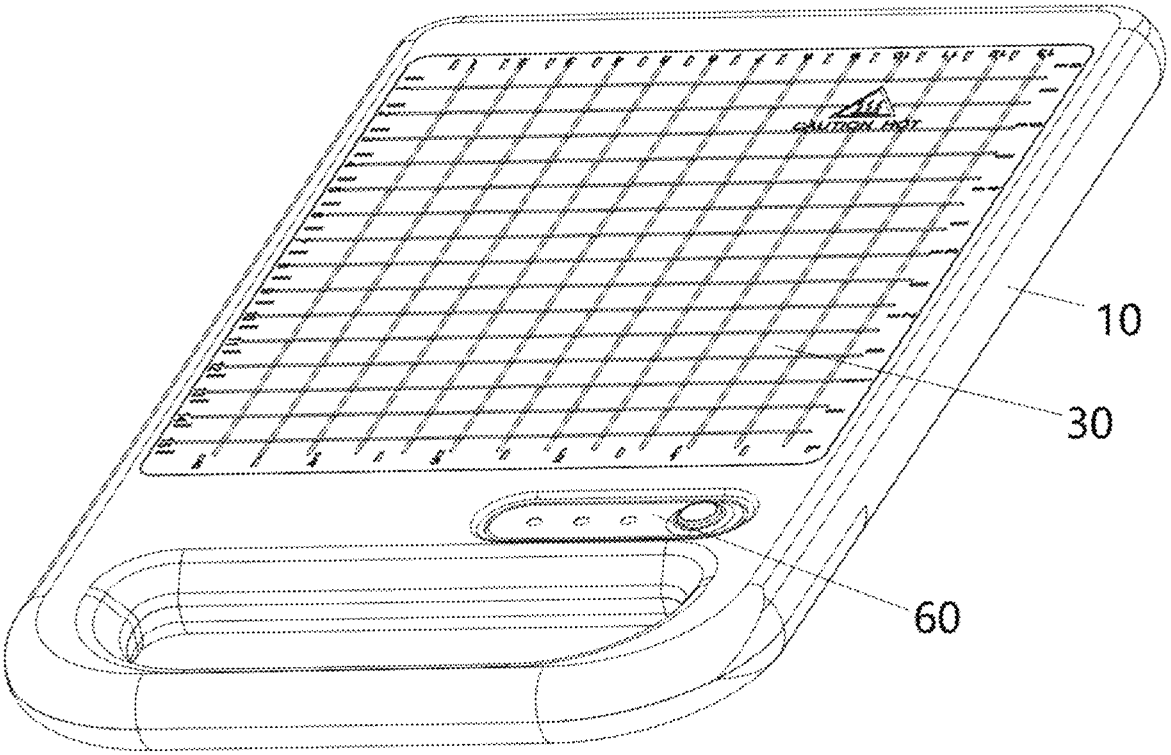
FIG. 5 is a three-dimensional schematic structural diagram of the portable thermal printing device of FIG. 1 with some elements removed.
Figure 6:
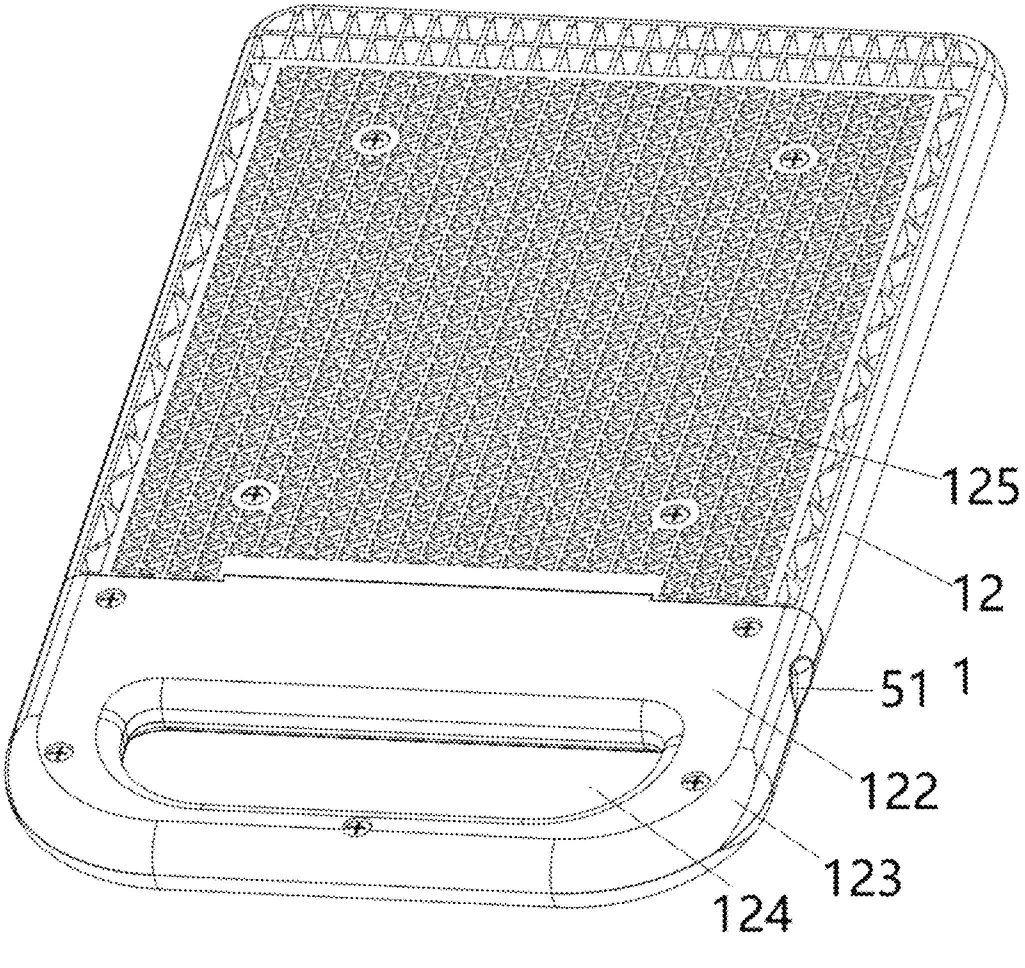
FIG. 6 is a three-dimensional schematic structural diagram of the portable thermal printing device of FIG. 5 from another perspective.
Figure 7:
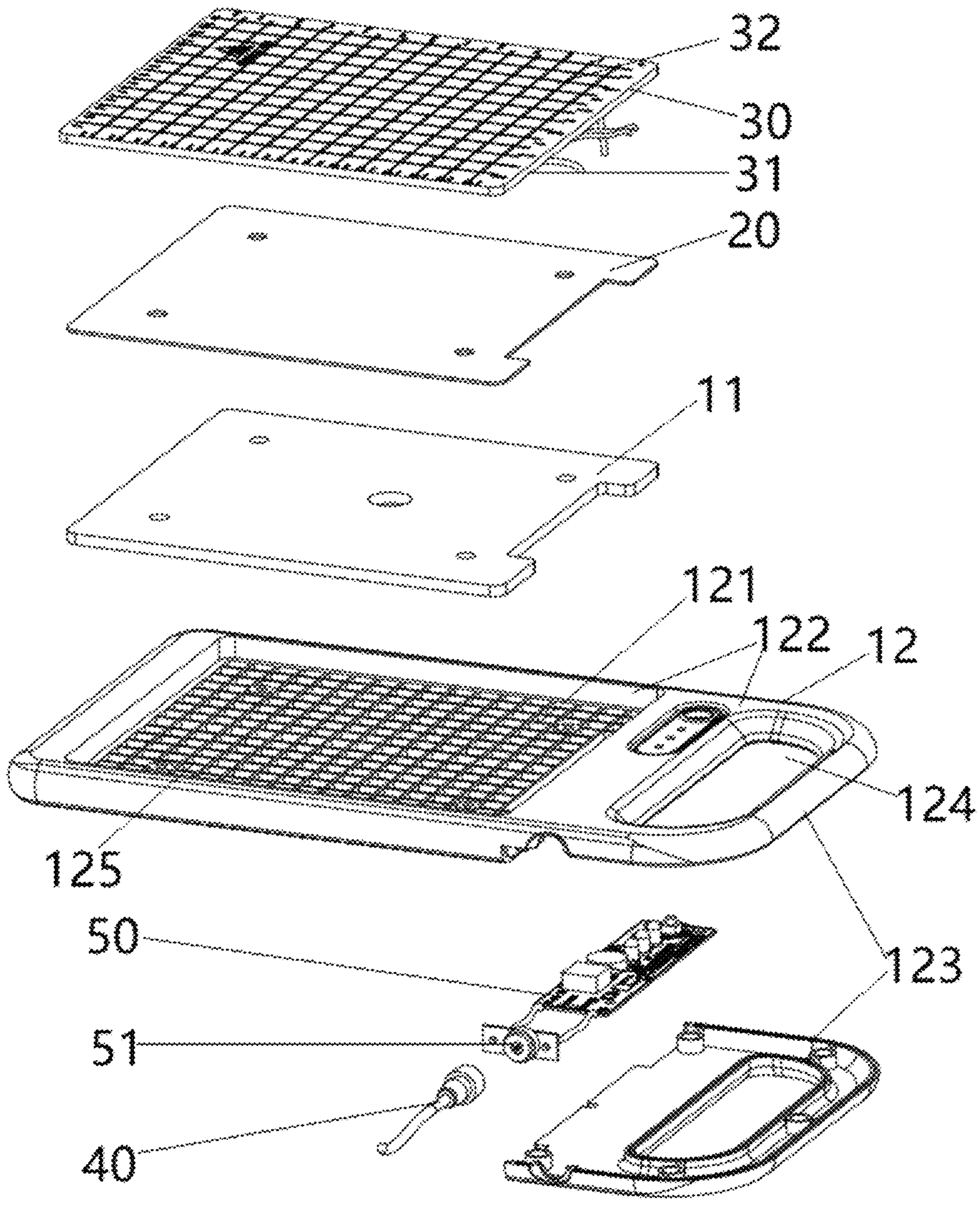
FIG. 7 is an exploded schematic structural diagram of the portable thermal printing device of FIG. 5.
Figure 8:
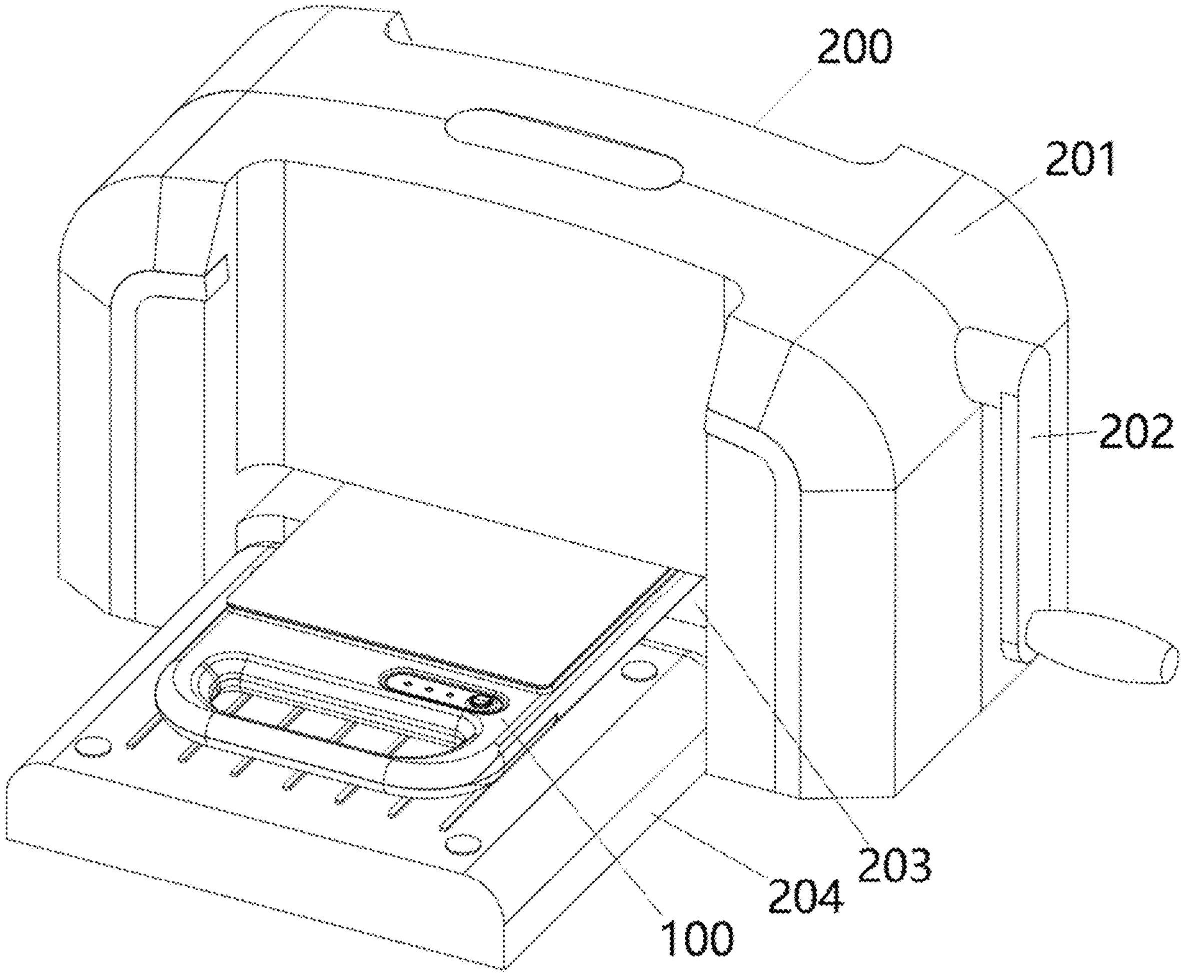
FIG. 8 is a schematic diagram of the portable thermal printing device of FIG. 1 and a rolling device in a use state.

Referring to FIG. 1 to FIG. 8, the present disclosure provides a portable thermal printing device 100, and the portable thermal printing device 100 is used in combination with a mold and a foil or a piece of paper to achieve Do It Yourself (DIY) type thermal printing operations. A rolling process is specifically carried out in combination with a rolling device 200. It may be understood that the rolling process may also be carried out by other devices capable of providing a pressure.

The Portable Thermal Printing Device 100 Specifically Includes:

- a support plate assembly 10;
- a heat insulation plate 20 disposed on the support plate assembly 10; and
- a heating plate 30 disposed on the heat insulation plate 20 and including a uniform heating plate body, a covering layer 31, and a heating element 32 disposed between the uniform heating plate body and the covering layer 31, where the heating plate 30 is configured to heat a thermal printing assembly.

In this embodiment, the support plate assembly 10, the heat insulation plate 20, and the heating plate 30 are distributed sequentially from bottom to top. The heating plate 30 at the upper side is configured to heat the thermal printing assembly, and the heat insulation plate 20 at the lower side is configured to prevent the heat of the heating plate 30 from being transferred to the lower side, thereby avoiding heat loss and improving the heating efficiency. Further, the heating plate 30 is disposed on the uniform heating plate body to achieve overall rapid heating of the heating plate 30, thereby further improving the heating efficiency.

The heating plate 30 is of an integrated structure. The heating element 32 is closely disposed on a side of the uniform heating plate body. The covering layer 31 correspondingly covers the side of the uniform heating plate body where the heating element 32 is arranged, and the three are integrated. Not only is stable connection achieved, but also the heat conduction performance is also high. Compared with a conventional heating plate, the heating plate 30 of the present disclosure has obvious advantages.

The support plate assembly 10 is connected to the heat insulation plate 20 via a fastener. Specifically, the fastener is a screw which passes through the support plate assembly 10 and is locked into the heat insulation plate 20. It may be understood that the fastener can also pass through the heat insulation plate 20 and is locked into the heating plate 30.

Further, the uniform heating plate body is connected side by side to the heat insulation plate 20, and the covering layer 31 is in contact with the thermal printing assembly. In this embodiment, the uniform heating plate body is disposed at the lower side and connected side by side to the heat insulation plate 20. The heating element 32 is disposed on the uniform heating plate body. The uniform heating plate body may accelerate the overall heating of the plate body and can form a stable support structure with the heat insulation plate 20 and further with the support plate assembly 10.

Further, the uniform heating plate body is a plate body made of a material with high thermal conductivity. Commonly, it is a metallic plate body, such as an aluminum plate, a copper plate, or a stainless steel plate. The aluminum plate is an aluminum alloy plate, and the copper plate is a copper alloy plate.

Further, the heating element 32 is one of a resistance wire, a reticular heating body, and a resistance element formed by sintering from a resistance paste, where the resistance wire, the reticular heating body, and the resistance element are distributed on the uniform heating plate body.

Further, the covering layer 31 is one of a silicone coating, a thermoplastic elastomer coating, a polyurethane coating, a biological resin coating, and a polypropylene coating. The covering layer 31 is configured to transfer the heat of the heating element 32 upwards to the thermal printing assembly, and has certain elasticity rather than rigidity. Thus, during contacting with the thermal printing assembly, the risk of unstable plate contact due to a local pressure can be avoided.

Further, the covering layer 31 is provided with location referencing lines for providing a position reference when the thermal printing assembly is placed.

Further, the portable thermal printing device 100 includes an electrical connection element 40 detachably connected to the heating element 32 via magnetic attraction and configured to connect to an external power source and supply power to the heating element 32.

In this embodiment, the electrical connection element 40 is connected to the external power source and connected, via magnetic attraction, to the heating element 32 for supplying power. This is convenient for the operating device to switch between a powered-on heating state and a powered-off transfer printing state.

Further, the portable thermal printing device 100 includes a circuit board 50 disposed on the support plate assembly 10. The heating element 32 is electrically connected to the circuit board 50. A magnetic attracting connector 51 is disposed on the circuit board 50. The electrical connection element 40 is fit with the magnetic attracting connector 51 via magnetic attraction. The electrical connection element 40 is configured to supply power to the heating element 32 via the circuit board 50. Specifically, the electrical connection element 40 and the magnetic attracting connector 51 are provided with corresponding magnetic chucks, facilitating corresponding operations and stable connection. In this embodiment, the circuit board 50, as a control core of the device, can control the operation of the device, e.g., control a heating temperature and a temperature holding time of the heating element 32, power-off protection in emergencies, etc. It may be understood that the circuit board may be omitted such that the heating element 32 is directly connected to the external power source via the electrical connection element 40 for heating. A user may start or stop heating according to an actual operation situation, and further conduct a rolling transfer printing operation.

Further, the circuit board 50 includes a DC-DC conversion module configured to receive an external DC voltage and convert the DC voltage to a predetermined DC voltage. Thus, the circuit board 50 may be fit with a plurality of power adapters. Furthermore, discharge of an electronic device (e.g., a mobile phone or a tablet computer) may also be used for supplying power.

Further, the support plate assembly 10 includes a support plate 11 disposed under the heat insulation plate 20 and a bottom plate 12 disposed under the support plate 11. The bottom plate 12 includes a supporting bottom plate 121 corresponding to the support plate 11 and a support frame 122 surrounding the supporting bottom plate 121. The circuit board 50 is disposed within the support frame 122. The magnetic attracting connector 51 is exposed from the support frame 122. In this embodiment, the support plate assembly 10 is of an assembly structure to serve as a support structure for the entire portable thermal printing device 100. Moreover, the support frame 122 is formed, which has a mounting space formed therein. The mounting space is adapted to mount the circuit board 50, the magnetic attracting connector 51, a key structure, and the like. Thus, the whole functions of the portable thermal printing device 100 are increased, and a relatively simple structural form is maintained.

The support frame 122 surrounds the supporting bottom plate 121 to form an accommodating space. Correspondingly, the heat insulation plate 20, the heating plate 30, the mold, and the foil can all be disposed within the receiving space such that the component structures are stable, thereby avoiding misalignment during the thermal printing process.

Further, the support frame 122 extends at one end of the supporting bottom plate 121 to form a handle frame 123. A gripping opening 124 is formed in the handle frame 123. In this embodiment, the support frame 122 is further formed as a structure convenient for gripping, thereby further improving the portability.

Further, the bottom plate 12 is provided with a heat dissipation structure 125. The bottom plate 12 is an opposite side of heat transfer printing, and the heat flowing therethrough is heat ineffective to the thermal printing process. In order to maintain long-term stable operation of the device, it is advantageous to provide the heat dissipation structure 125 accordingly. Specifically, the heat dissipation structure 125 may be a hollowed-out frame structure.

Further, the portable thermal printing device 100 includes a buzzer (not shown) electrically connected to the circuit board 50 and configured to produce a buzzing prompt sound. The buzzer may be configured for timing and prompting. For example, the buzzing prompt sound is provided after heating for a certain time.

Further, the portable thermal printing device 100 includes a key module 60 disposed on the support plate assembly 10 and electrically connected to the circuit board 50. The key module 60 is configured for a user to press keys to perform operations, such as starting heating, stopping heating, and setting a heating time or a heating temperature.

Further, the portable thermal printing device 100 includes a thermal printing assembly. The thermal printing assembly includes a thermal printing template 70, a thermal printing paper 80, and a hard paper board 90 that are stacked in sequence. The thermal printing template 70 can be disposed on the heating plate 30. The thermal printing paper 80 may be a metal foil, such as an aluminum foil.

The portable thermal printing device 100 is configured to apply a pressure to the hard paper board 90 by one of manual pressing equipment, isostatic pressing equipment, or a rolling device 200 such that a pattern of the thermal printing template is transfer-printed onto the thermal printing paper 80. In a preferred embodiment, the portable rolling device 200 is configured to be used in combination with the portable thermal printing device 100.

Further, the portable thermal printing device 100 includes a bearing base 95 disposed under the support plate assembly 10. The bearing base 95 is configured to bear an external pressure applied to the portable thermal printing device 100. Specifically, external pressure equipment is in contact with the hard paper board 90 to apply a pressure, such as a rolling pressure or a static pressure, such that the portable thermal printing device 100 performs the transfer printing operation. The bearing base 95 provides a bearing force at the lower side.

The bearing base 95 includes a pressure bearing plate 96 and a limiting edge 97 extending from a periphery of the pressure bearing plate 96 towards the support plate assembly 10. The support plate assembly 10 corresponds to a space between the pressure bearing plate 96 and the limiting edge 97. The pressure bearing plate 96 is configured to provide a bearing force.

Further, the heat insulation plate 20 includes one of an aerogel plate, a vacuum thermal isolation plate, a polyurethane rigid foam plate, an expanded polystyrene plate, and an extruded polystyrene plate.

Further, the support plate assembly 10 is made of a material of one of phenolic plastics, epoxy resin, urea resin, melamine formaldehyde resin, polypropylene, polyvinyl chloride, and polystyrene.

Further, the rolling device 200 includes a housing 201, two silicone rollers (not shown) disposed within the housing 201, and a rotary operating element 202 disposed on the housing 201 and linked with one silicone roller. A rolling space (not shown) is formed between the two silicone rollers. The housing 201 is provided with a rolling opening 203 communicating with the rolling space. The portable thermal printing device 100 is capable of entering or being disengaged from the rolling space through the rolling opening 203. A bearing element 204 is further disposed outside the housing 201 corresponding to the rolling opening 203. In this embodiment, a user controls the rotary operating element 202 to rotate, driving one silicone roller to rotate. At the connection point of one end of the portable thermal printing device 100 with the silicone roller, the silicone roller rotates to enter the corresponding rolling space. When the portable thermal printing device 100 passes through the rolling opening 203 and the rolling space, the rotary operating element 202 is operated reversely such that the portable thermal printing device 100 moves reversely relative to the silicone roller, thereby realizing roller return and completing the rolling process.

The portable thermal printing device of the present disclosure is provided with the miniaturized support plate assembly 10, heat insulation plate 20, and heating plate 30, and the heating plate 30 is provided with the uniform heating plate body, the covering layer 31, and the heating element 32 disposed therebetween. During the heating process, on the one hand, the overall heating of the heating plate can be accelerated with the uniform heating plate body, achieving effective heating; and on the other hand, ineffective heating caused by heat loss can be reduced.

It should be further noted that, in this description, relationship terms such as first and second are only used to distinguish an entity or operation from another entity or operation, but do not necessarily require or imply that there is any actual relationship or order between these entities or operations. In addition, terms "include", "comprise", or any other variations thereof are intended to cover a non-exclusive inclusion, so that a process, a method, an article, or a device including a series of elements not only includes those elements, but also includes other elements that are not explicitly listed, or also includes inherent elements of the process, the method, the article, or the device. In the case that there are no more restrictions, an element limited by the statement "includes a . . . " does not exclude the presence of additional identical elements in the process, the method, the article, or the device that includes the element.

The above description of the disclosed embodiments can enable a person skilled in the art to implement or practice this application. Various modifications to the embodiments are readily apparent to a person skilled in the art, and the generic principles defined herein may be practiced in other embodiments without departing from the spirit or scope of this application. Thus, this application is not limited to the embodiments shown herein but falls within the widest scope consistent with the principles and novel features disclosed herein.

What is claimed is:

1. A portable thermal printing device, comprising:

a support plate assembly;

a heat insulation plate disposed on the support plate assembly; and a heating plate disposed on the heat insulation plate and comprising a uniform heating plate body, a covering layer, and a heating element disposed between the uniform heating plate body and the covering layer, wherein the heating plate is configured to heat a thermal printing assembly, wherein the heating element comprising a resistance wire, resistance paste, or equivalents thereof, wherein the thermal printing assembly comprising a template, printing plate, or equivalents thereof;

wherein the portable thermal printing device further comprises a circuit board disposed on the support plate assembly, the heating element is electrically connected to the circuit board; a magnetic attracting connector is disposed on the circuit board, the electrical connection element is fit with the magnetic attracting connector via magnetic attraction, and the electrical connection element is configured to supply power to the heating element via the circuit board;

wherein the support plate assembly comprises a support plate disposed under the heat insulation plate and a bottom plate disposed under the support plate; the bottom plate comprises a supporting bottom plate corresponding to the support plate and a support frame surrounding the supporting bottom plate; the circuit board is disposed within the support frame; and the magnetic attracting connector is exposed from the support frame;

wherein the support frame extends at one end of the supporting bottom plate to form a handle frame; and a gripping opening is formed in the handle frame.

2. The portable thermal printing device according to claim 1, wherein the uniform heating plate body is connected side by side to the heat insulation plate, and the covering layer is in contact with the thermal printing assembly.

3. The portable thermal printing device according to claim 2, wherein the uniform heating plate body is one of an aluminum plate, a copper plate, and a stainless steel plate.

4. The portable thermal printing device according to claim 2, wherein the heating element is one of a resistance wire, a reticular heating body, and a resistance element formed by sintering from a resistance paste, wherein the resistance wire, the reticular heating body, and the resistance element are able to be distributed on the uniform heating plate body.

5. The portable thermal printing device according to claim 2, wherein the covering layer is one of a silicone coating, a thermoplastic elastomer coating, a polyurethane coating, a biological resin coating, and a polypropylene coating.

6. The portable thermal printing device according to claim 2, wherein the covering layer is provided with location referencing lines.

7. The portable thermal printing device according to claim 1, further comprising an electrical connection element detachably connected to the heating element via magnetic attraction and configured to connect to an external power source and supply power to the heating element.

8. The portable thermal printing device according to claim 1, wherein the circuit board comprises a direct current to direct current (DC-DC) conversion module configured to receive an external DC voltage and convert the DC voltage to a predetermined DC voltage.

9. The portable thermal printing device according to claim 1, wherein the bottom plate is provided with a heat dissipation structure comprising a hollowed-out frame structure, or equivalents thereof.

10. The portable thermal printing device according to claim 1, further comprising: a buzzer electrically connected to the circuit board and configured to produce a buzzing prompt sound; and/or a key module disposed on the support plate assembly and electrically connected to the circuit board.

11. The portable thermal printing device according to claim 1, wherein the thermal printing assembly comprises a thermal printing template, a thermal printing paper, and a hard paper board that are stacked in sequence, and the thermal printing template is disposed on the heating plate; and the thermal printing paper is disposed on the thermal printing template.

12. The portable thermal printing device according to claim 11, wherein a pressure is applied to the portable thermal printing device by one of manual pressing equipment, isostatic pressing equipment, or a rolling device such that a pattern of the thermal printing template is transfer-printed onto the thermal printing paper.

13. The portable thermal printing device according to claim 12, further comprising a bearing base disposed under the support plate assembly.

14. The portable thermal printing device according to claim 13, wherein the bearing base comprises a pressure bearing plate and a limiting edge extending from a periphery of the pressure bearing plate towards the support plate assembly; and the support plate assembly corresponds to a space between the pressure bearing plate and the limiting edge.

15. The portable thermal printing device according to claim 1, wherein the heat insulation plate comprises one of an aerogel plate, a vacuum thermal isolation plate, a polyurethane rigid foam plate, an expanded polystyrene plate, and an extruded polystyrene plate.

16. The portable thermal printing device according to claim 1, wherein the support plate assembly is made of a material of phenolic plastics, epoxy resin, urea resin, melamine formaldehyde resin, polypropylene, polyvinyl chloride, and polystyrene.

* * * * *